(12) United States Patent
Vasagiri et al.

(10) Patent No.: US 12,198,107 B2
(45) Date of Patent: *Jan. 14, 2025

(54) METHODS AND APPARATUS FOR SCHEDULING TIMESLOTS USING MACHINE LEARNING PROCESSES

(71) Applicant: Walmart Apollo, LLC, Bentonville, AR (US)

(72) Inventors: Ajaykartheek Vasagiri, Milpitas, CA (US); Faraz Hussain, Mississauga (CA); Kamal Manglani, Fremont, CA (US); Ashwin Sureshkumar, Woodbridge (CA); Sriram Krishnaswamy, Fremont, CA (US); Chittaranjan Tripathy, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,944

(22) Filed: Aug. 25, 2023

(65) Prior Publication Data
US 2023/0419269 A1 Dec. 28, 2023

Related U.S. Application Data

(63) Continuation of application No. 17/162,148, filed on Jan. 29, 2021, now Pat. No. 11,783,298.

(51) Int. Cl.
*G06Q 10/1093* (2023.01)
*G06N 20/00* (2019.01)
(Continued)

(52) U.S. Cl.
CPC ......... *G06Q 10/1093* (2013.01); *G06N 20/00* (2019.01); *G06Q 10/0835* (2013.01); *G06Q 50/40* (2024.01)

(58) Field of Classification Search
CPC ........... G06Q 10/1093; G06Q 10/0835; G06Q 40/50; G06N 20/00; G06N 3/044; G06N 3/09; G06N 20/20
See application file for complete search history.

(56) References Cited

U.S. PATENT DOCUMENTS 7,251,612 B1 * 7/2007 Parker .............. G06Q 10/06316
705/7.22
8,156,013 B2 4/2012 Dearlove et al.
(Continued)

OTHER PUBLICATIONS

Chen et al., "A Dynamic Pricing Model for Time Slot Management in Attended Home Delivery Logistics," 2014, pp. 1-11.

*Primary Examiner* — Dylan C White
(74) *Attorney, Agent, or Firm* — Morgan, Lewis & Bockius LLP; Manita Rawat

(57) ABSTRACT

This application relates to automatically scheduling timeslots, such as timeslots for scheduling item pickups and deliveries. The embodiments may employ machine learning process to determine, for each of a plurality of timeslots, a timeslot capacity. The embodiments may further determine a time as to when each of the plurality of timeslots become available for selection, such as on a webpage. In some examples, the time determined to make available for selection each of the plurality of timeslots is based on a predetermined amount of time before the timeslot. Further, the embodiments may provide for display each of the plurality of timeslots at the determined time. The embodiments may further include receiving a selection of one of the plurality of timeslots, and scheduling a pickup or delivery based on the selected timeslot. The machine learning processes may be trained with features generated from historical timeslot data and workforce availability.

18 Claims, 11 Drawing Sheets

(51) Int. Cl.
   *G06Q 10/0835*   (2023.01)
   *G06Q 50/40*   (2024.01)

(56) References Cited

U.S. PATENT DOCUMENTS

| | | | |
|---|---|---|---|
| 8,825,507 B1* | 9/2014 | Ginda | G06Q 10/1095 |
| | | | 379/265.09 |
| 8,892,741 B2 | 11/2014 | Lipari et al. | |
| 9,561,941 B1 | 2/2017 | Watts | |
| 10,176,463 B2 | 1/2019 | Abebe et al. | |
| 11,126,954 B2* | 9/2021 | Smith | G06Q 30/0633 |
| 11,783,298 B2* | 10/2023 | Vasagiri | G06N 3/09 |
| | | | 705/7.18 |
| 2013/0054805 A1 | 2/2013 | Lipari et al. | |
| 2014/0040075 A1 | 2/2014 | Perry et al. | |
| 2014/0330739 A1 | 11/2014 | Falcone et al. | |
| 2018/0039897 A1* | 2/2018 | Joshi | G06N 5/04 |
| 2018/0075404 A1 | 3/2018 | Hendrickson | |
| 2019/0263521 A1 | 8/2019 | O'Brien et al. | |
| 2020/0273000 A1* | 8/2020 | Li | G06Q 30/02 |
| 2020/0342395 A1 | 10/2020 | Rajkhowa et al. | |
| 2022/0101257 A1 | 3/2022 | Wason et al. | |
| 2022/0327599 A1* | 10/2022 | Krishnamoorthy | G06Q 10/06312 |
| 2022/0383391 A1* | 12/2022 | Krishnamoorthy | G06Q 30/0633 |
| 2022/0398526 A1* | 12/2022 | Krishnamoorthy | G06Q 10/063116 |

\* cited by examiner

| | DAY N | DAY N +1 | DAY N + 2 |
|---|---|---|---|
| 8:00 – 9:00 AM | OPEN 610 | OPEN | OPEN |
| 9:00 – 10:00 AM | OPEN | OPEN | OPEN |
| 10:00 – 11:00 AM | OPEN | FULL 612 | FULL |
| 11:00 – 12:00 PM | OPEN | OPEN | OPEN |
| 12:00 – 1:00 PM | FULL | FULL | 1:00 |
| 1:00 – 2:00 PM | OPEN | OPEN | 2:00 |
| 2:00 – 3:00 PM | FULL | OPEN | 3:00 614 |
| 3:00 – 4:00 PM | OPEN | OPEN | 4:00 |
| 4:00 – 5:00 PM | FULL | OPEN | 5:00 |
| 5:00 – 6:00 PM | FULL | FULL | 6:00 |

FIG. 6

METHODS AND APPARATUS FOR SCHEDULING TIMESLOTS USING MACHINE LEARNING PROCESSES

CROSS-REFERENCE TO RELATED APPLICATIONS

This application is a continuation of U.S. patent application Ser. No. 17/162,148, filed Jan. 29, 2021, and entitled "METHODS AND APPARATUS FOR SCHEDULING TIMESLOTS USING MACHINE LEARNING PROCESSES," which is incorporated herein in its entirety by reference.

TECHNICAL FIELD

The disclosure relates generally to machine learning processes and, more specifically, to electronically scheduling timeslots using machine learning processes.

BACKGROUND

At least some known online retailers allow customers to place purchase orders remotely through a purchasing system. For example, some retailers use at least some known purchasing systems that allow customers to place purchase orders through the retailer's website. As another example, some retailers allow customers to place purchase orders through an application ("App") that executes on a mobile device, such as a cellular phone. Often times, the purchasing system provides an option to the customer to have the purchased items delivered to an address, such as to the customer's home address. At least some known purchasing systems, however, provide an option to allow the customer to pick up the purchased goods at a store location. For example, the customer can select a store location when making the purchase, and have the retailer gather the goods and have them ready for customer pickup. Some purchasing systems allow the customer to check-in ahead of time to let the retailer know the customer is on their way to pick up the purchased goods at a store location.

When scheduling a pickup or delivery, some retailers allow the customer to select a pickup time or delivery time. For example, the website or App may allow the customer to select a timeslot for a particular day to have purchased items ready for pickup at a store location, or to be delivered. Often times, however, more preferred timeslots quickly become unavailable, as customers select those preferred timeslots and the timeslots' capacities are met. This practice may inconvenience other customer that may only be available during those now unavailable timeslots to pickup purchased items or have them delivered. Indeed, some customers may decide to not make the purchase, or make the purchase elsewhere, thereby resulting in loss sales to the retailer. As such, there are opportunities to address these and other problems with scheduling timeslots.

SUMMARY

The embodiments described herein are directed to automatically scheduling timeslots, such as timeslots for scheduling item pickups and deliveries. The embodiments may employ machine learning process to determine, for each of a plurality of timeslots, a timeslot capacity. The timeslot capacity may identify a number of customers that may schedule a timeslot. The embodiments may further determine a time as to when each of the plurality of timeslots become available for selection, such as on a webpage. In some examples, the time determined to make available for selection each of the plurality of timeslots is based on a predetermined amount of time before the timeslot. Further, the embodiments may provide for display each of the plurality of timeslots at the determined time. The embodiments may further include receiving a selection of one of the plurality of timeslots, and scheduling a pickup or delivery based on the selected timeslot. The machine learning processes may be trained with features generated from historical timeslot data and workforce availability (e.g., picker workforce schedules for pickups and loading and driver schedules for deliveries). For example, the machine learning processes may include machine learning models that are trained with features generated from historical timeslot selections, timeslot demand over previous periods of time, timeslot sales over previous periods of time, and workforce availability.

In accordance with various embodiments, exemplary systems may be implemented in any suitable hardware or hardware and software, such as in one or more suitable computing devices. For example, in some embodiments, a computing device configured to obtain order data for a previous period, and obtain capacity data for a location for a future period. The computing device is also configured to generate first features based on the order data, and to generate second features based on the capacity data. The computing device is further configured to determine, for each of a plurality of timeslots, a timeslot capacity based on the first features and the second features. The computing device is also configured to generate timeslot data comprising the time slot capacity for each of the plurality of timeslots. Further, the computing device is configured to transmit the timeslot data. In some examples, the computing device is configured to generate a timeslot availability time for each of the plurality of timeslots, and include the timeslot availability times within the timeslot data.

In some embodiments, a method includes obtaining order data for a first previous period, and obtaining capacity data for a location for a future period. The method also includes generating first features based on the order data, and generating second features based on the capacity data. The method further includes determining, for each of a plurality of timeslots, a timeslot capacity based on the first features and the second features. The method also includes generating timeslot data comprising the time slot capacity for each of the plurality of timeslots. Further, the method includes transmitting the timeslot data. In some examples, the method includes generating a timeslot availability time for each of the plurality of timeslots, and including the timeslot availability times within the timeslot data.

In some embodiments, a non-transitory computer readable medium has instructions stored thereon. The instructions, when executed by at least one processor, cause a device to perform operations that include obtaining order data for a first previous period, and obtaining capacity data for a location for a future period. The operations also include generating first features based on the order data, and generating second features based on the capacity data. The operations further include determining, for each of a plurality of timeslots, a timeslot capacity based on the first features and the second features. The operations also include generating timeslot data comprising the time slot capacity for each of the plurality of timeslots. Further, the operations include transmitting the timeslot data. In some examples, the operations include generating a timeslot availability time for each of the plurality of timeslots, and including the timeslot availability times within the timeslot data.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 6 illustrates a graphical user interface with timeslot selections in accordance with some embodiments;

DETAILED DESCRIPTION

Figure 1:
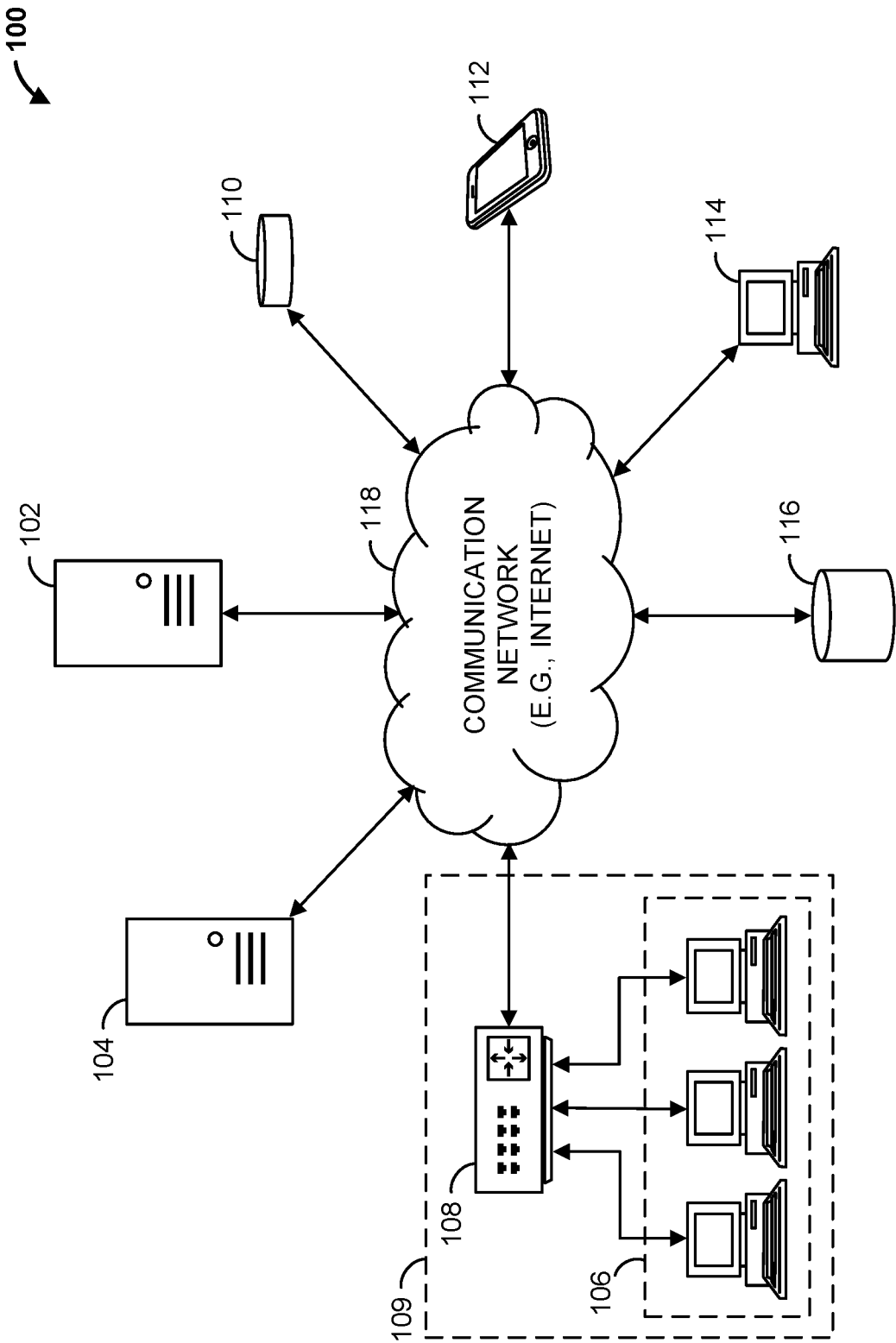
FIG. 1 is a block diagram of an ecommerce system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments employ machine learning processes to determine timeslot capacities for each of a plurality of timeslots, where customers can schedule pickups or deliveries during periods defined by each timeslot. For example, the embodiments may apply trained machine learning models to historical timeslot data and worker schedules to determine how many orders can be accommodated (e.g., provided for pickup or delivered) during each timeslot.

In some examples, the embodiments train a machine learning model based on a corpus that includes historical timeslot data and workforce schedules. For example, the embodiments may generate features based on historical timeslot data identifying previous timeslot selections, and trains a machine learning model based on the historical timeslot data. For example, features may be generated based on historical timeslot selections, timeslot demand over previous periods of time, timeslot sales over previous periods of time, and workforce availabilities. The trained machine learning model may then be employed to determine timeslot capacities for a plurality of timeslots that can be scheduled on a future date.

Further, the embodiments may determine when to make available each of the timeslots. For example, the embodiments may allow timeslots to become available for selection on a website at different times throughout a day, thereby allowing customers to book timeslots at those various times. In some examples, if a timeslot is not yet made available, the embodiments may display a time as to when the timeslot will become available.

Turning to the drawings, FIG. 1 illustrates a block diagram of an ecommerce system 100 that includes timeslot determination computing device 102 (e.g., a server, such as an application server), web server 104, workstation(s) 106, database 116, and multiple customer computing devices 110, 112, 114 operatively coupled over network 118. Timeslot determination computing device 102, workstation(s) 106, web server 104, and multiple customer computing devices 110, 112, 114 can each be any suitable computing device that includes any hardware or hardware and software combination for processing and handling information. For example, each of timeslot determination computing device 102, web server 104, workstations 106, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, timeslot determination computing device 102 can be a computer, a workstation, a laptop, a server such as a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Although FIG. 1 illustrates three customer computing devices 110, 112, 114, ecommerce system 100 can include any number of customer computing devices 110, 112, 114. Similarly, ecommerce system 100 can include any number of workstation(s) 106, timeslot determination computing devices 102, web servers 104, and databases 116.

Workstation(s) 106 are operably coupled to communication network 118 via router (or switch) 108. Workstation(s) 106 and/or router 108 may be located at a store 109, for example. Workstation(s) 106 can communicate with one or more of web server 104 and timeslot determination computing device 102 over communication network 118. For example, workstation(s) 106 may send data to, and receive data from, each of web server 104 and timeslot determination computing device 102.

Database 116 can be a remote storage device, such as a cloud-based server, a memory device on another application server, a networked computer, or any other suitable remote storage. Timeslot determination computing device 102 is operable to communicate with database 116 over communication network 118. For example, timeslot determination computing device 102 can store data to, and read data from, database 116. Although shown remote to timeslot determination computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, web server 104 hosts a website, such as a retailer's website, that allows customers to purchase items, such as grocery items. The website may further allow each customer to schedule purchased orders to be picked up (e.g., by the customer) at a location, such as store 109, or to be delivered (e.g., to the customer's home address). To schedule the pickup or delivery, the website may allow the customer to select a timeslot during which the items are to be picked up or delivered. For example, the customer may cause a customer computing devices 110, 112, 114 to execute an application, such as a browser, to access the website. The customer may place one or more items in an online shopping cart, and initiate a "checkout" of the items. Once the customer selects whether to pick up the items or have the items delivered, the website may present the customer with one or more timeslots on one or more days that the customer may select for item pickup or delivery. For example, the website may present the customer with hourly timeslots from 8 am to 6 pm on each of a plurality of days. In some examples, a portion of the timeslots may not be available for selection. For example, the unavailable timeslots may be "greyed out." In some examples, the timeslot may not be available because the timeslot capacity for the timeslot has been satisfied (e.g., the maximum number of pickups or deliveries for the timeslot have already been scheduled). The website may display an indication such as "FULL" when this is the case. In other examples, the timeslot may not have been made available yet. In this case, the website may display a time as to when the timeslot will become available (e.g., a future date and time, or a future time in the current day). If the customer wishes to select one of these timeslots, in some examples the customer may leave the items in the online shopping cart, and attempt to schedule the timeslot once the displayed time is reached. In some examples, the web site may allow the customer to save the items as a "temporary order" until the customer comes back to schedule the pickup or delivery.

Timeslot determination computing device 102 may determine the timeslot capacities for the timeslots, as well as when to make each timeslot available for selection. For example, to determine timeslot capacities, timeslot determination computing device 102 may obtain workforce availability data for a particular location, such as at store 109. The website may allow customers to pickup orders at store 109, or have items delivered (e.g., from store 109). Store 109 may employ "pickers" who put together orders for pickup and/or delivery, and may further employ drivers for delivery of the orders. The workforce availability data may identify how many pickers and/or drivers are available over a future period of time, such as from a period that starts two days from a current day to nine days from the current day (e.g., a one week period). Further, timeslot determination computing device 102 may obtain timeslot booking data for previous timeslots (e.g., data identifying timeslots selected for pickup or delivery over the previous month), timeslot sales data over the same period (e.g., amount of sales), session data identifying timeslot impressions (e.g., data identifying the viewing of timeslot webpages by customers), weather and other locality-dependent features (e.g., a game day or a rally or a local area shut-down), and the store/fulfilment center picker workforce availability.

Timeslot determination computing device 102 may generate features based on the workforce availability data, timeslot booking data, timeslot sales data, and session data, and apply a trained machine learning model to the generated features to determine a timeslot capacity for each of the timeslots. The machine learning model may be, for example, a supervised machine learning model that predicts a time-series, such as one based on Auto Regressive Integrated Moving Average (ARIMA), Vector autoregression (VAR), random forest, gradient boosting, or recurrent neural networks (RNN), or an ensemble of all or some of these machine learning models. In some examples, an RNN is employed to generate time-series/panel features that can be used with other additional features in a non-linear ML model, such as one based on random forest, gradient boosting or another RNN, to predict the timeslot capacities.

The machine learning model may be trained with similar features generated from a corpus of historical data (e.g., such as historical data over the last year). For example, timeslot determination computing device 102 may generate features from workforce availability data, timeslot booking data, timeslot sales data, and session data corresponding to purchases over a previous period of time, and may train the machine learning model with the generated features. In addition, features may be generated based on exogenous factors, such whether days fall on a holiday, special events, extreme weather, sales events, and any factor that may lead to increased, or decreased, sales.

In some examples, reinforcement learning (RL) is used to identify if an increase in timeslot capacity for a particular hour leads to more conversions (e.g., purchases). In some examples, a multi-armed bandit based framework can be used for implementing the explore-exploit mechanism. For example, consider an 11 am to noon timeslot for pickups which has a capacity of 15. In other words, at most 15 in-store pickups can be scheduled by customers given constraints on the store associates to pick and fulfill the orders. Assume an additional 15 slots can be opened for that hour for a total of 30. If utilization is 10, that is, 10 customers ended up using the timeslot, timeslot determination computing device 102 learns that instead of 15 only 10 timeslots were needed (or to allow for a buffer say 11 or 12 slots). However, if instead there was an actual demand of 25, the demand would not have been seen as the timeslot would have been closed once 15 customers selected that timeslot. To learn the increase, timeslot determination computing device 102 employs a paradigm of reinforcement learning, performing an explore-exploit analysis on the timeslot. For example, timeslot determination computing device 102 may open 15 timeslots initially for an 11 am to noon timeslot on 90% of days (e.g., in a month), and for the remaining 10% of the days increasing the capacity by an amount (e.g., 1 or 2 at a time) to determine the capacity is met. If the higher capacity is met, a further increase is made. If the higher capacity is not met, the capacity is not increased (and, in some examples, decreased). The machine learning model (e.g., time series model) may use the updated capacity as ground truth to predict a new capacity for a future time period.

This explore-exploit based reinforcement learning model not only learns an optimal number of slots that need to be opened, it also adaptively, without human-intervention, can make those adjustments on an occasional (e.g., daily basis) to the slot capacity so that discrepancy between the customer-demand for slots, and the ability to open the maximum number of slots for that hour given the constraint of store/fulfilment center picker workforce availability and other fulfilment related logistics challenges, is minimized, thereby leading to an optimal slot availability for customers where customer pick-up or order delivery times can be met.

Further, timeslot determination computing device 102 determines when to make each timeslot available for selection (e.g., availability times). In some examples, timeslot determination computing device 102 determines to make timeslots available on a predetermined basis, such as an hourly basis. For example, timeslot determination computing device 102 may determine to open up timeslots a predetermined amount of time (e.g., 24 hours) before the time associated with each timeslot. For example, a timeslot for 8 am to 9 am in two days may be made available for selection at 9 the following day, while a timeslot for 2 pm to 3 pm may be made available for selection at 3 pm the following day.

In some examples, timeslot determination computing device 102 employs an RL-based model to determine the availability times. The timeslot availability times may be adaptively adjusted using an explore-exploit mechanism with an objective of smoothing out timeslot consumption over time (e.g., throughout the day). The explore-exploit mechanism may try out different slot opening times on different days to dynamically determine optimal availability times that are consumed (e.g., selected) more uniformly. The explore-exploit mechanism may further adjust timeslot availability times on low-transaction days and high-transaction days (e.g. holidays, festivals, sales days, and special events).

Timeslot determination computing device 102 may generate timeslot data identifying the timeslot capacities and availability times, and transmit the timeslot data to web server 104. Web server 104 may provide for selection the timeslots based on the availability times, and may further allow timeslots to be selected up to the timeslot capacities. Moreover, web server 104 may display a time each timeslot is going to be made available for selection based on the availability times. As such, the customer is made aware as to an exact time when a timeslot will be made available for booking.

Figure 2:
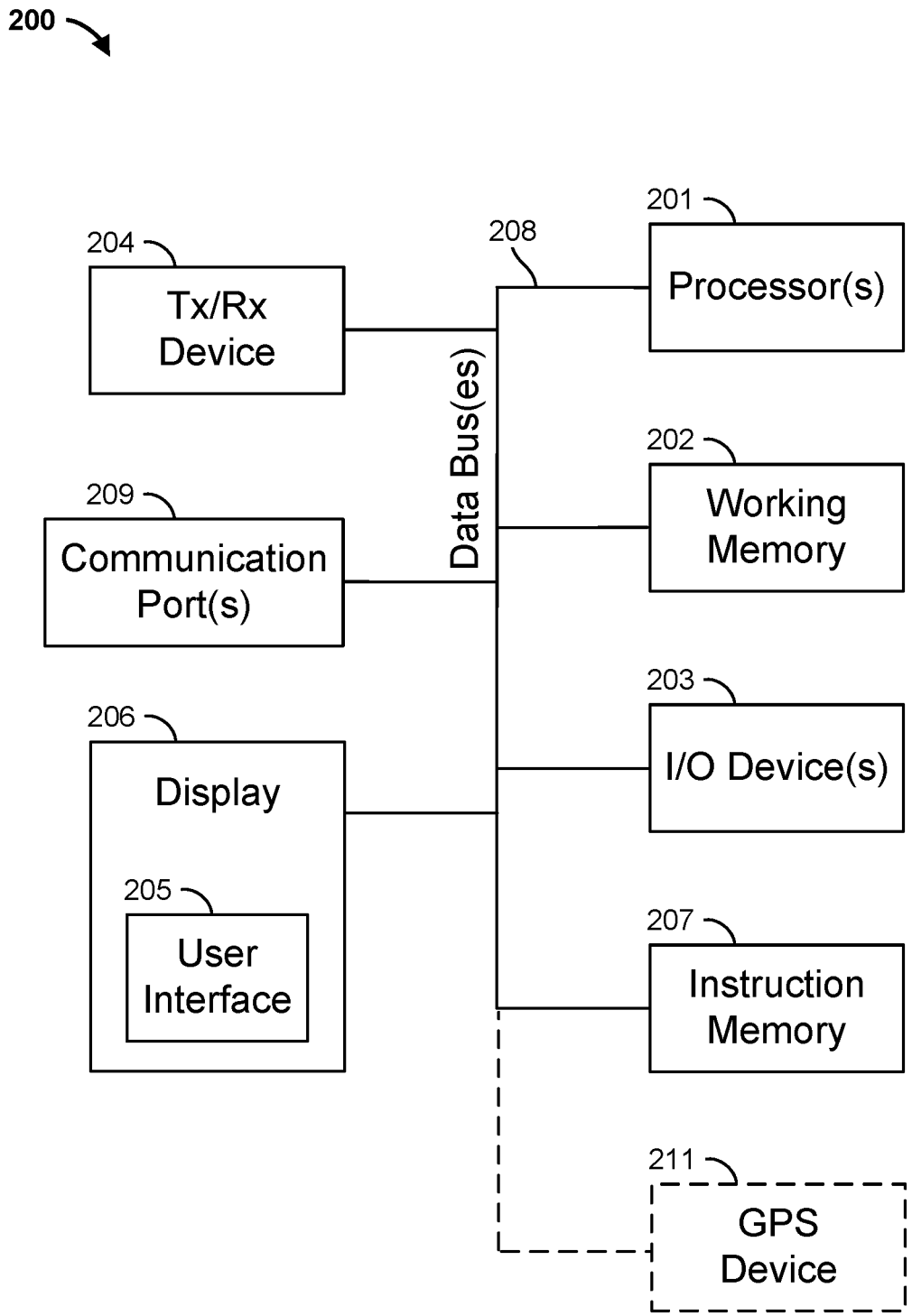
FIG. 2 is a block diagram of an exemplary timeslot determination computing device in accordance with some embodiments.

FIG. 2 illustrates an exemplary timeslot determination computing device 102. Timeslot determination computing device 200 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of timeslot determination computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, timeslot data.

Display 206 can display user interface 205. User interfaces 205 can enable user interaction with timeslot determination computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 timeslot determination computing device 102 will be operating in. Processor(s) 201 is operable to receive data from, or send data to, a network, such as communication network 118 of FIG. 1, via transceiver 204.

Figure 3:
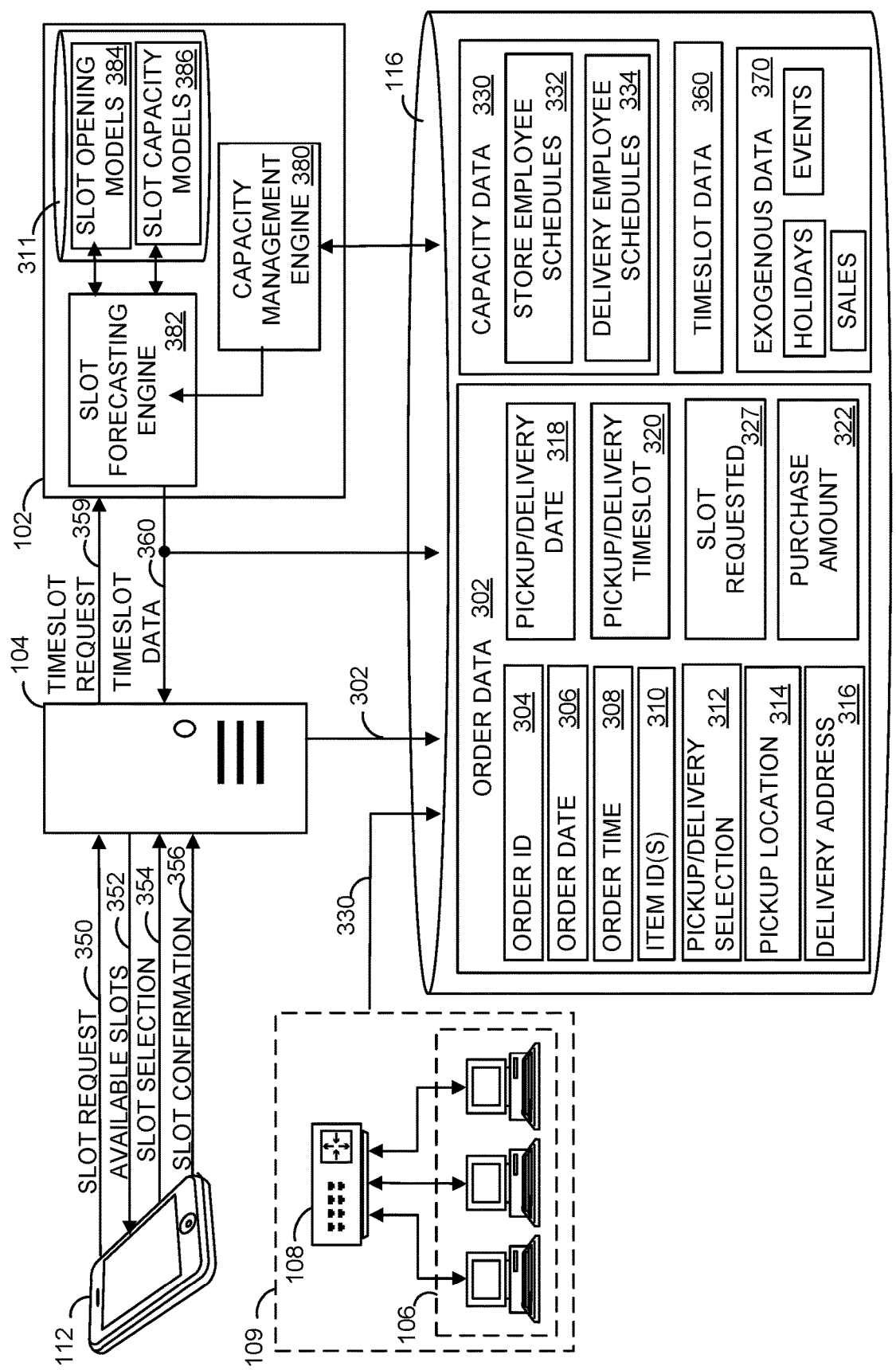
FIG. 3 is a block diagram illustrating examples of various portions of the ecommerce system of FIG. 1 in accordance with some embodiments.

FIG. 3 illustrates a block diagram illustrating various portions of the ecommerce system 100 of FIG. 1. In this example, a customer, via customer computing device 112, may access a website hosted by web server 104. The customer may place items into an online shopping cart, and initiate a checkout of the items. The website may then allow the customer to select a day, and timeslot within the day, for pickup or delivery of the items. For example, customer computing device 112 may transmit a slot request 350 to web server 104, where the slot request 350 identifies one or more days for which to select a timeslot. In some examples, the slot request 350 also identifies order data (e.g., the items being purchased).

In response to receiving slot request 350, web server 104 transmits available slots 352. The available slots 352 may include a period of time (e.g., 1 hour or 2 hour periods), and a corresponding day (e.g., day of the week). Timeslots that have reached capacity may be identified as "FULL," while timeslots that are not yet available for selection may include a time that they will be made available for selection. Assuming the customer selects an available timeslot, customer computing device 112 may transmits slot selection 354 to web server 104, where the slot selection 354 identifies the selected slot. Web server 104 may perform operations to schedule the customer during the selected timeslot. For example, web server 104 may determine whether the timeslot capacity for the selected timeslot would be violated if the customer is scheduled during that timeslot. If the timeslot capacity would not be violated (e.g., assigning the customer to the timeslot does not increase the total number of customers assigned to the timeslot by more than the timeslot capacity), the customer is assigned to the timeslot. If the timeslot capacity would be violated (e.g., assigning the customer to the timeslot does increase the total number of customers assigned to the timeslot more than the timeslot capacity), the customer is not assigned to the timeslot. In some examples, web server 104 may transmit a slot confirmation 356 to customer computing device 112, confirming whether the customer has been scheduled to the selected timeslot.

In some examples, web server 104 stores order data, such as order data received within slot request 350, to database 116. Order data 302 may include for each order, for example, an order identification (ID) 304, an order date 306, item ID(s) 310, purchase amount 322, and an order time 308. Order data 350 may further include a pickup or delivery selection 312 that identifies whether the customer selected a pickup (e.g., from store 109), or a delivery (e.g., to the customers home address), as well as a pickup or delivery date 318 and a pickup or delivery timeslot 320. If pickup or delivery selection 312 identifies a pickup, order data 302 may further include a pickup location 314 (e.g., store 109). Otherwise, if pickup or delivery selection 312 identifies a delivery, order data 302 may further include a delivery address 316.

Database 116 may further store capacity data 330, which may include store employee (e.g., pickers) schedules 332 and delivery employee schedules 334 for each of a plurality of locations (e.g., store 109 locations, warehouse locations used for delivery, etc.). For example, workstation 106, from store 109, may store capacity data 330 within database 116. Database 116 may further store exogenous data 370, which may identify holidays, events, sales, special events, extreme weather (e.g., snow days), or any other factors that my increase, or decrease, sales activities.

To provide available slots 352, web server 104 receives timeslot data 360 from timeslot determination computing device 102. For example, web server 104 may receive timeslot data 360 in response to a timeslot request 359. The timeslot request 359 may identify one or more days for which timeslot data 360 is requested. Timeslot data 360 identifies, for each of a plurality of timeslots (e.g., timeslots on each day of a week), a timeslot capacity and a timeslot availability time.

In this example, timeslot determination computing device 102 includes slot forecasting engine 382, capacity management engine 380, and data repository 311. In some examples, one or more of slot forecasting engine 382 and capacity management engine 380 may be implemented in hardware. In some examples, one or more of slot forecasting engine 382 and capacity management engine 380 may be implemented as an executable program maintained in a tangible, non-transitory memory, such as instruction memory 207 of FIG. 2, which may be executed by one or processors, such as processor 201 of FIG. 2.

Slot forecasting engine 382 may obtain one or more slot opening models 384 from data repository 311, and apply the one or more slot opening models 384 to determine timeslot availability times for timeslots. Each of the slot opening models 384 may be an algorithm, a machine learning model such as a time-series model, or any other suitable model.

Similarly, slot forecasting engine 382 may obtain one or more slot capacity models 386, and apply the one or more slot capacity models 386 to generated features to determine timeslot capacities for the timeslots. The machine learning model may be, for example, a supervised machine learning model that predicts a time-series, such as one based on AutoRegressive Integrated Moving Average (ARIMA), Vector autoregression (VAR), or recurrent neural networks (RNN).

Capacity management engine 380 may obtain order data 302 and capacity data 330 from database 116, and may generate features based on the obtained order data 302 and capacity data 330. Capacity management engine 380 may also obtain exogenous data 370 to generate additional features, such as features based on holidays, events, sales, or any other exogenous data 370. In some examples, capacity management engine 380 employs an RNN to generate time-series/panel features that can be used with other additional features in a non-linear ML model employed by slot forecasting engine 382, such as one based on random forest, gradient boosting or another RNN, to predict the timeslot capacities.

Figure 4:
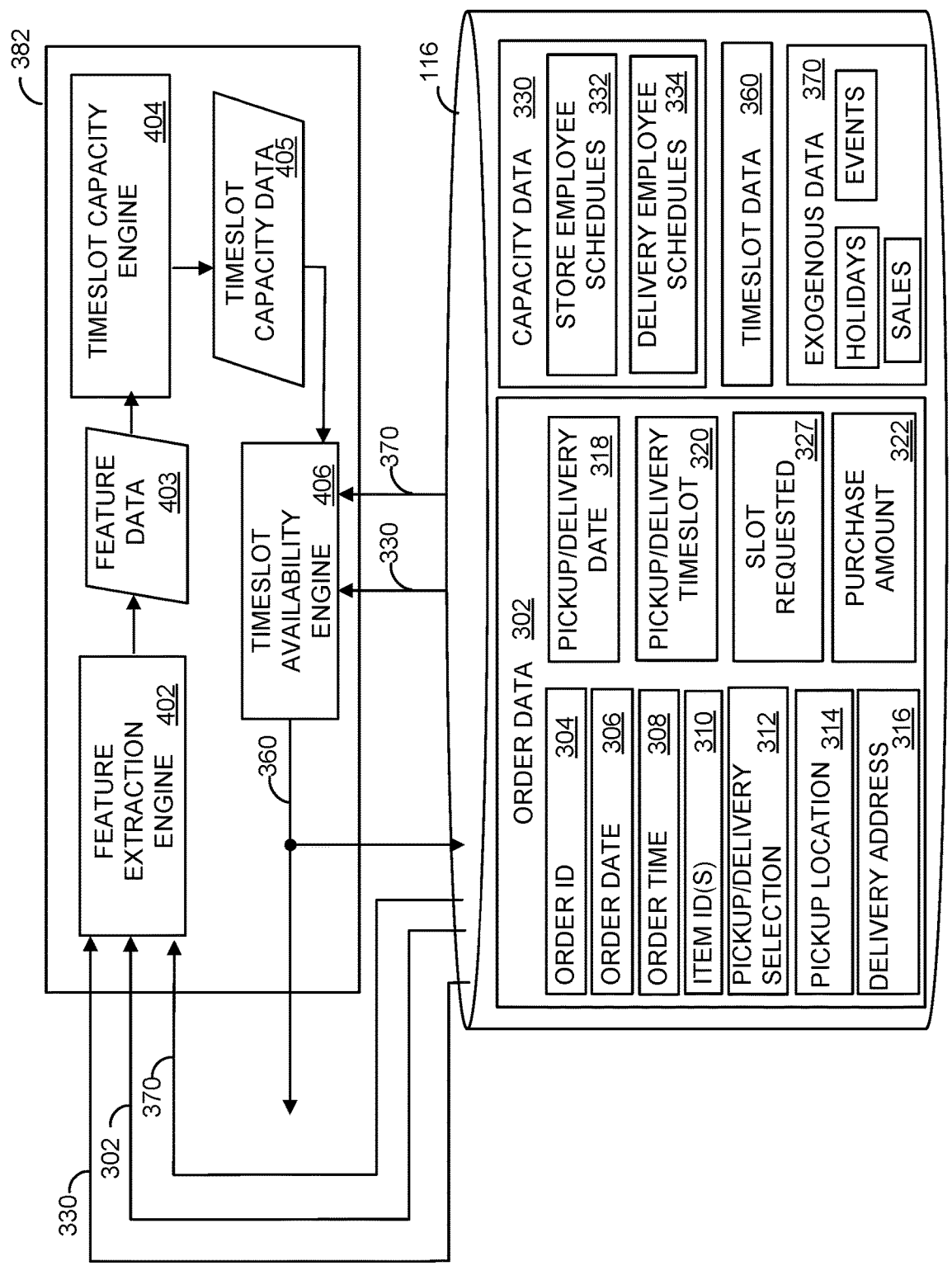
FIG. 4 is a block diagram illustrating examples of various portions of the ecommerce system of FIG. 1 in accordance with some embodiments.

FIG. 4 illustrates further details of the slot forecasting engine 382. In this example, slot forecasting engine 382 includes a feature extraction engine 402, timeslot capacity engine 404, and timeslot availability engine 406. Feature extraction engine 402 is operable to obtain order data 302, capacity data 330, and exogenous data 370 from database 116, and generate feature data 403 based on the obtained data. Feature data 403 may include feature vectors for one or more features. In some examples, feature data 403 includes features based on historical timeslot selections (e.g., pickup and delivery timeslot 320), timeslot demand over previous periods of time (e.g., slot requested 327), timeslot sales over previous periods of time (e.g., purchase amount 322), and workforce availability (e.g., store employee schedules 332, delivery employee schedules 334).

Timeslot capacity engine 404 receives feature data 403 from feature extraction engine 402, and applies a slot capacity model 384 to the feature data 403 to generate timeslot capacity data 405. Timeslot capacity data 405 identifies a timeslot capacity for each timeslot. Timeslot availability engine 406 receives the timeslot capacity data 405, and further obtains capacity data 330 and, in some examples, exogenous data 370, each from database 116.

In some examples, timeslot capacity engine 404 applies one or more rules (e.g., constraints) to the determined timeslot capacities. For example, timeslot capacity engine 404 may apply a maximum timeslot capacity rule, where the timeslot capacity cannot exceed a predetermined number. If it does (as generated by the model), timeslot capacity engine 404 reduces the timeslot capacity to the predetermined number. As another example, timeslot capacity engine 404 may apply a minimum timeslot capacity rule, where generated timeslot capacities cannot be below a predetermined minimum (e.g., 5). As another example, timeslot capacity engine 404 may apply an algorithm that operates on feature data 403 based on capacity data 330, where a maximum timeslot capacity and a minimum timeslot capacity are determined based on a number of employees working during the corresponding time slot for a given location, such as store 109.

Timeslot availability engine 406 applies a slot capacity model 386 to determine timeslot availability times. In some examples, application of the slot capacity model 386 generates timeslot availability times based on a predetermined basis, such as an hourly basis. For example, the timeslot availability times may be a predetermined amount of time (e.g., 24 hours) before the time associated with each timeslot. In some examples, slot capacity model 386 is an RL-based model, and timeslot availability engine 406 adaptively adjust the timeslot availability times using an explore-exploit mechanism. For example, the RL-based model may operate on exogenous data 370 to determine whether timeslot availability times should be sooner, or later. For example, during holiday or special events, the RL-based model may determine that timeslots should be made available for selection earlier, rather than later, to assist with increased demand.

Timeslot availability engine 406 generates timeslot data 360 identifying the timeslot availability times and the timeslot capacities within timeslot capacity data 405. Timeslot availability engine 406 transmits the timeslot data 360 to, for example, web server 104. In some examples, timeslot availability engine 406 stores timeslot data 360 in database 116.

Figure 5A:
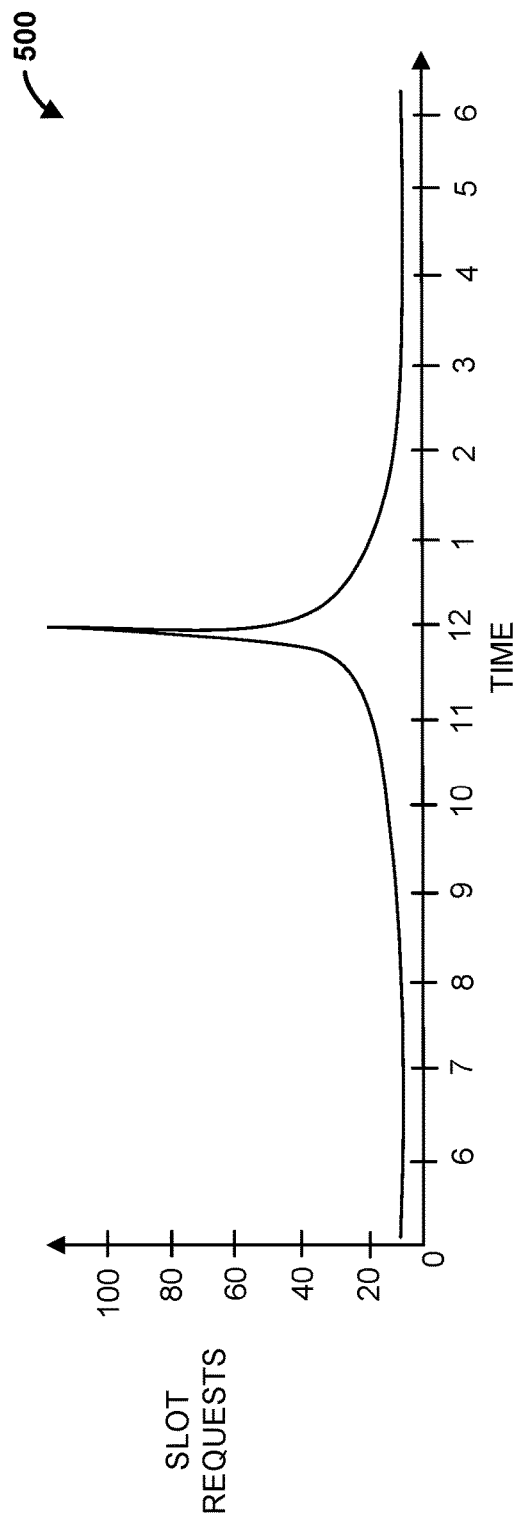
FIG. 5A illustrates a prior art chart of slot requests over time.

FIG. 5A illustrates a diagram 500 illustrating timeslot requests as may be generated by prior art ecommerce systems. In this example, many (e.g., most) timeslot requests are made available near midnight. For example, the prior art ecommerce systems may provide timeslots with availability for a day all at one time, such as at midnight. This may force customers wishing to schedule a preferred timeslot to wait until midnight before scheduling a pickup or delivery.

Figure 5B:
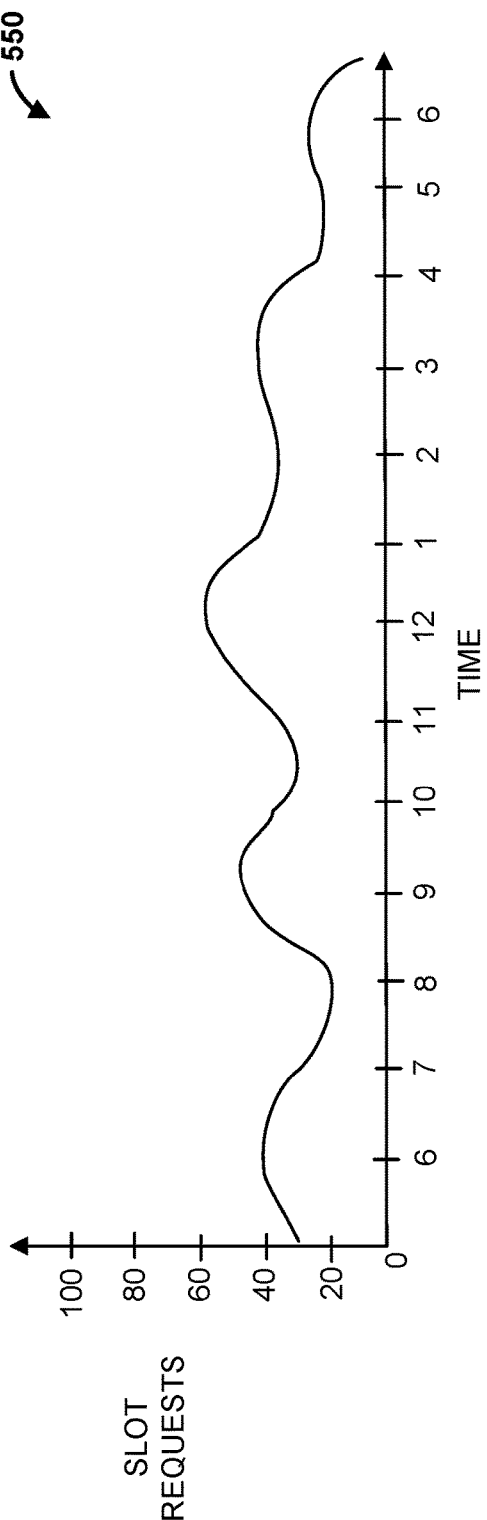
FIG. 5B illustrates a chart of slot requests over time in accordance with some embodiments.

By contrast, FIG. 5B illustrates a diagram 550 with timeslot requests as may be generated by ecommerce system 100. In this example, timeslot determination computing device 102 determines timeslots with availability times throughout the day. Moreover, each timeslot is associated with a timeslot capacity that is determined by the machine learning processes described herein. As such, ecommerce system 100 is much more adaptable to the buying habits and preferences of customers, and makes available new timeslots to customers throughout the day. In addition, even when a timeslot is not available for selection, ecommerce system 100 may provide a time when the timeslot will become available, providing customers advance notice of when they will become available for scheduling.

FIG. 6 illustrates graphical user interface (GUI) 600 that includes timeslots 602 for a plurality of days 604. GUI 600 may be displayed, for example, by web server 104 in response to a slot request 350. Each timeslot 602 is associated with a timeslot capacity and a timeslot availability time, which may have been determined by timeslot determination computing device 102 and received by web server 104 within timeslot data 360.

Each timeslot may further display a status of "OPEN," "FULL," or a time that the timeslot will become available. For example, timeslot 610 indicates a status of "OPEN," while timeslot 612 indicates a status of "FULL." A status of "OPEN" indicates that the timeslot may be scheduled. For example, a customer may click on a timeslot with a status of "OPEN" to schedule a pickup or delivery. A status of "FULL" indicates a timeslot's capacity has been met. Timeslot 614, however, indicates that the timeslot will become available for scheduling at 3:00 pm. In this example, the timeslots 602 that have not yet become available (e.g., timeslot 614) will become available at the end of their corresponding time period. For example, timeslot 614 becomes available at 3:00 pm, at the end of its corresponding 2:00 pm to 3:00 pm time period. As an example, at 3:00 pm, web server 104 updates timeslot 614 to display "OPEN."

Figure 7:
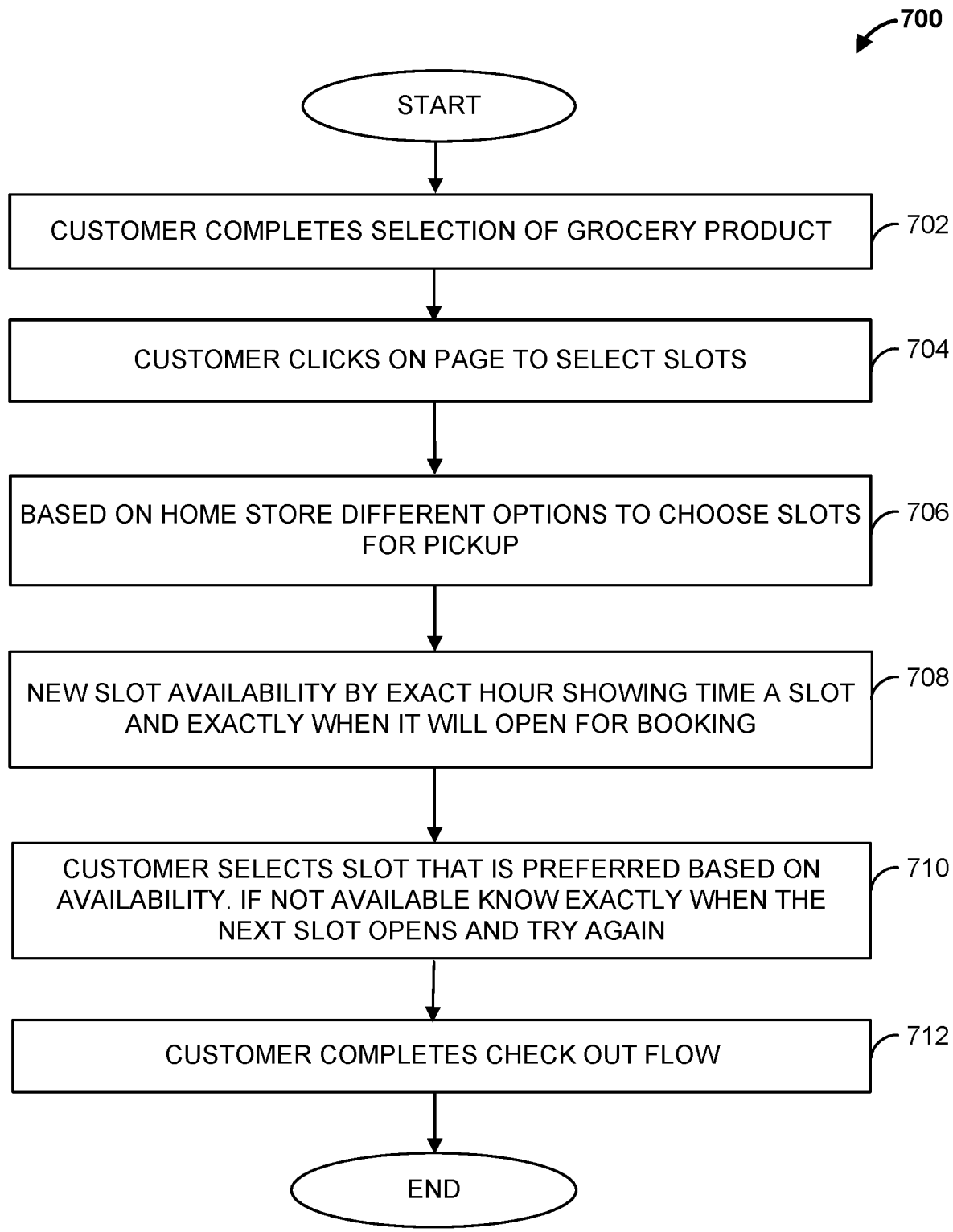
FIG. 7 is a flowchart of an example method that can be carried out by the ecommerce system 100 of FIG. 1 in accordance with some embodiments.

FIG. 7 is a flowchart of an example method 700 that can be carried out by the ecommerce system 100 of FIG. 1. Beginning at step 702, a customer completes a selection of a grocery product. For example, a customer may access a retailer's website hosted by web server 104 via a browser executing on customer computing device 112. The customer may add one or more grocery products to an online shopping cart, and initiate a checkout. At step 704, the customer clicks on a webpage to select timeslots. For example, in response to the checkout, the website may provide the customer an option to pick up the grocery products, or to have the grocery items delivered. The customer may click on a selection, which then takes the customer to a webpage to select timeslots.

At step 706, based on the customer's home store, a plurality of timeslots are displayed. For example, assuming the customer's home store is store 109, the website may display a plurality of timeslots over one or more days for pickup at store 109. Web server 104 may have received timeslot data 360 identifying and characterizing the timeslots for store 109. As an example, the website may display GUI 600. At step 708, web server 104 displays, for at least one timeslot that is not yet available for selection, a timeslot availability time. The timeslot availability time indicates when the timeslot will become available for schedule for pickup.

At step 710, the customer selects a timeslot that is preferred based on the customer's availability. In some examples, if the customer's preferred timeslot is not yet available, the customer returns to complete the checkout at or after the preferred timeslot's availability time. At step 712, the customer completes the checkout. Web server 104 schedules the customer for pickup of the items during the timeslot. Workers at store 109 may prepare the grocery products for pickup during the timeslot, and the customer may arrive at store 109 during the timeslot to pick up the grocery items. The method then ends.

Figure 8:
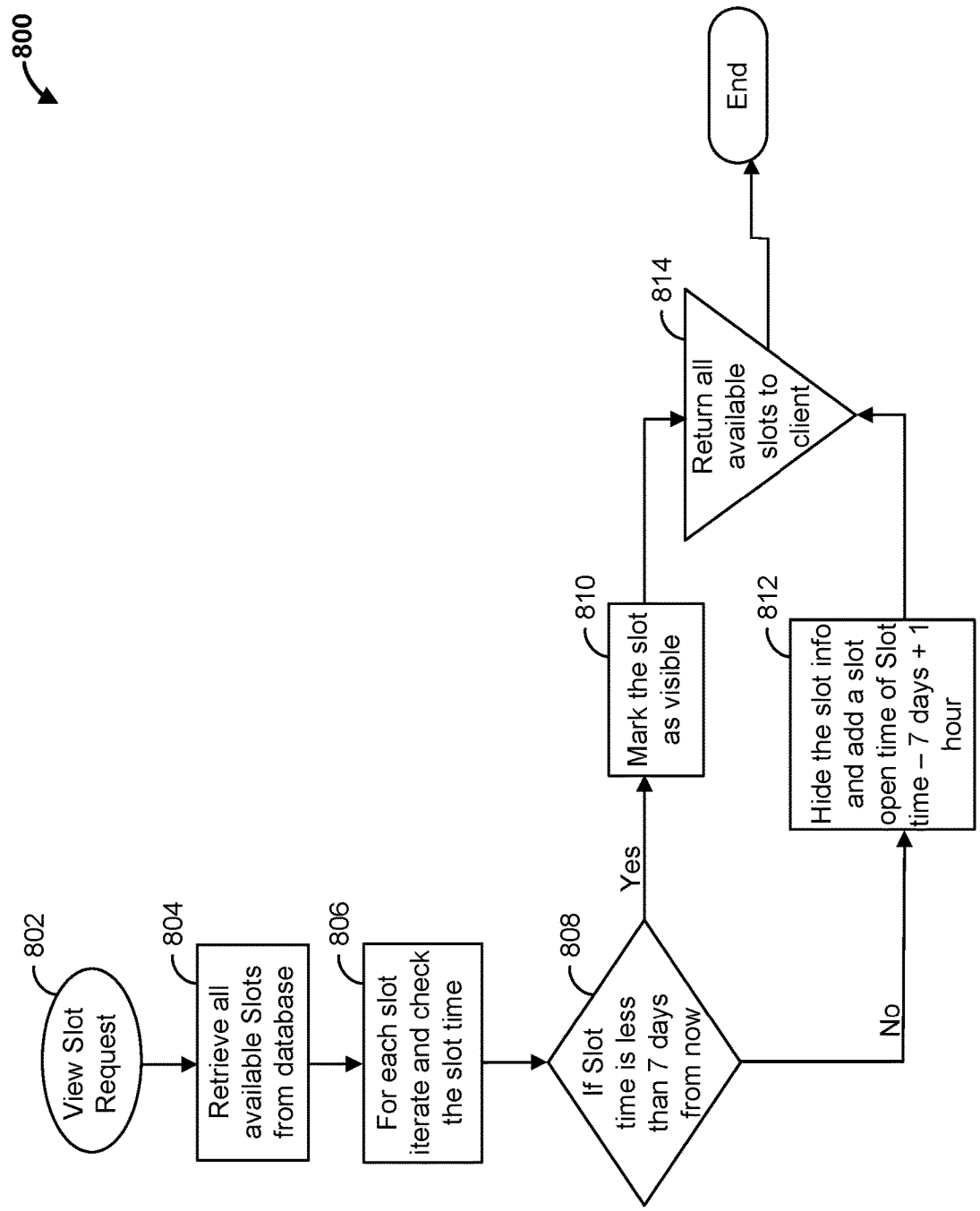
FIG. 8 is a flowchart of another example method that can be carried out by the ecommerce system 100 of FIG. 1 in accordance with some embodiments.

FIG. 8 is a flowchart of an example method 800 that can be carried out by the ecommerce system 100 of FIG. 1. Beginning at step 802, a request for timeslots is received.

For example, web server 104 may receive a slot request 350 from customer computing device 112 to view timeslots for an item pickup or delivery. At step 804, timeslots are retrieved from a database, where the retrieved timeslots are based on the request. For example, web serve 104 may retrieve timeslot data 360 from database 116 for all timeslots corresponding to days for the future pickup or delivery.

Proceeding to step 806, for each timeslot, determine the corresponding timeslot availability time. For example, web server 104 may determine the timeslot availability time for each timeslot based on corresponding timeslot data 360. The timeslot availability time may include a date, and a time, for example. At step 808, a determination is made, for each timeslot, as to whether the timeslot availability time is less than a threshold number of days from now. In this example, the threshold is 7 days. If the timeslot availability time for a timeslot is less than 7 days from now, the method proceeds to step 810, where the timeslot is marked as visible. For example, web server 104 may display "OPEN" for the timeslot. If, however, at step 808 the timeslot availability time for a timeslot is not less than 7 days from now, the method proceeds to step 812. At step 812, an available time is computed for the timeslot. The available time is determined based on the timeslot availability time for the timeslot, and the current day and time. For example, the available time may be computed by subtracting the threshold number of days (7 in this example) from the timeslot availability time, and adding one hour. As such, only timeslots with timeslot availability times for the next threshold number of days are made available for selection.

Once all timeslots are complete, the method proceeds to step 814. At step 814, the timeslots are provided to the client. For example, web server 104 may transmit available slots 352 identifying the timeslots and corresponding status (e.g., "OPEN") or available times to customer computing device 112. The method then ends.

Figure 9A:
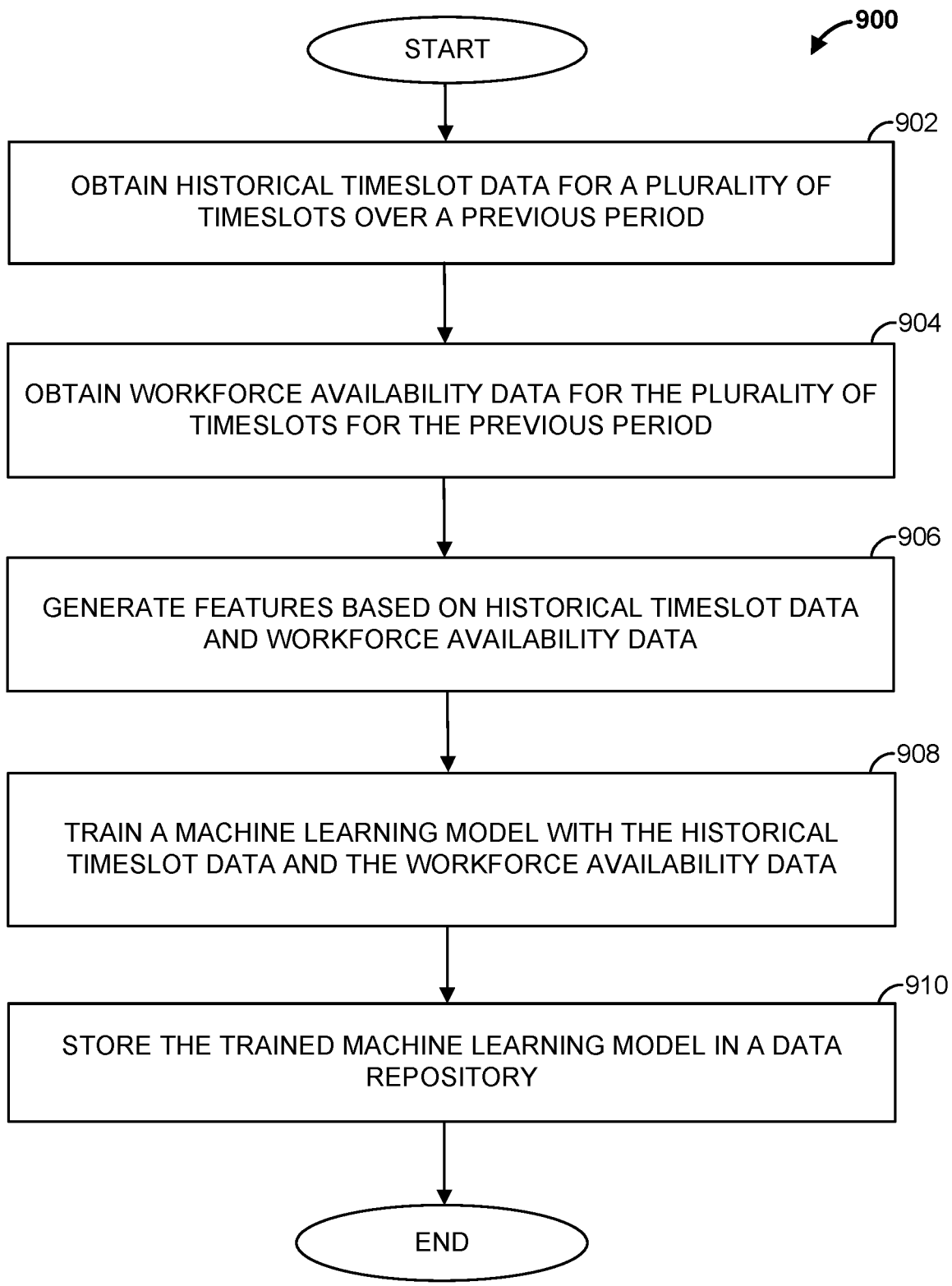
FIG. 9A is a flowchart of another example method that can be carried out by the ecommerce system 100 of FIG. 1 in accordance with some embodiments.

FIG. 9A is a flowchart of an example method 900 for training a machine learning model that can be carried out by the ecommerce system 100 of FIG. 1. Beginning at step 902, historical timeslot data for a plurality of timeslots over a previous period is obtained. For example, timeslot determination computing device 102 may obtain from database 116 slots requested 327 for orders with order dates 306 during the previous period (e.g., last 6 months). At step 904, workforce availability data is obtained. The workforce availability data identifies a number of workers available during the plurality of timeslots for the previous period. For example, timeslot determination computing device 102 may obtain from database 116 store employee schedules 332 and/or delivery employee schedules 334 that correspond to one or more of the plurality of timeslots over the previous period.

Proceeding to step 906, features are generated based on the historical timeslot data and the workforce availability data. For example, timeslot determination computing device 102 may generate feature data 403 based on the slots requested 327, store employee schedules 332, and/or delivery employee schedules 334. At step 908, a machine learning model is trained with the generated features. For example, timeslot determination computing device 102 may train a machine learning model based on ARIMA, VAR, random forest, gradient boosting machine, or a RNN, or an ensemble of a plurality of these models. The machine learning model is trained to predict timeslot capacities. At step 910, the trained machine learning model is stored in a data repository. For example, timeslot determination computing device 102 may store the trained machine learning model within data repository 311 as a slot capacity model 386. The method then ends.

Figure 9B:
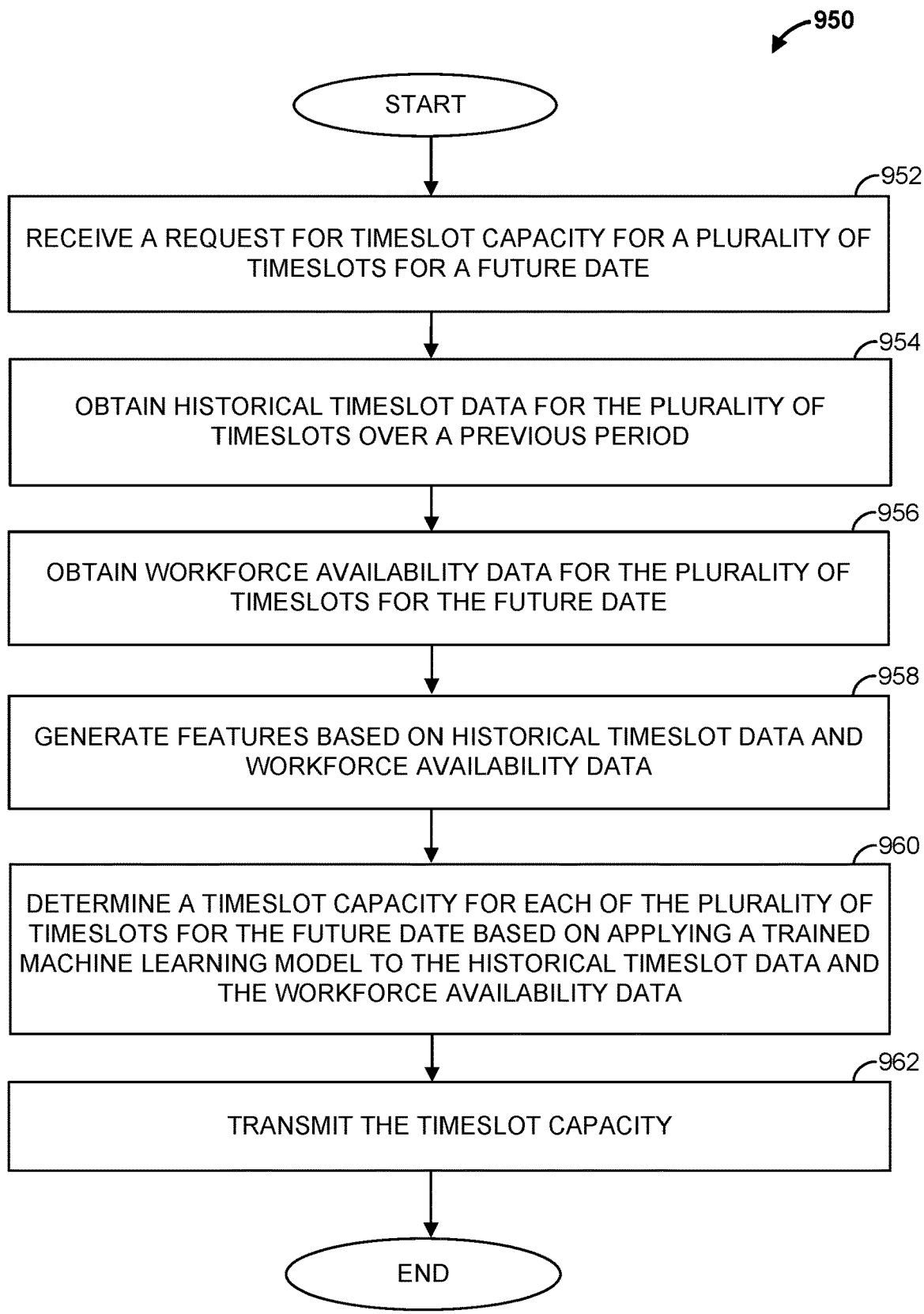
FIG. 9B is a flowchart of another example method that can be carried out by the ecommerce system 100 of FIG. 1 in accordance with some embodiments.

FIG. 9B is a flowchart of an example method 950 that can be carried out by the ecommerce system 100 of FIG. 1. Beginning at step 952, a request for timeslot capacities is received. The request is for a plurality of timeslots for a future date. For example, timeslot determination computing device 102 may receive a request for the plurality of timeslots from web server 104. At step 954, historical timeslot data is obtained for the plurality of timeslots over a previous period. The previous period may be, for example, a previous 7 days. For example, timeslot determination computing device 102 may obtain from database 116 slots requested 327 for orders with order dates 306 during the previous period. At step 958, workforce availability data for the plurality of timeslots for the future date is obtained. For example, timeslot determination computing device 102 may obtain from database 116 store employee schedules 332 and/or delivery employee schedules 334 that correspond to one or more of the plurality of timeslots for the future date.

Proceeding to step 958, features are generated based on the historical timeslot data and the workforce availability data. For example, timeslot determination computing device 102 may generate feature data 403 based on the slots requested 327, store employee schedules 332, and/or delivery employee schedules 334. At step 960, a timeslot capacity for each of the plurality of timeslots for the future date is determined based on applying a trained machine learning model to the generated features. The trained machine learning model may be the trained machine learning model of FIG. 9A. For example, timeslot determination computing device 102 may apply a slot capacity model 386 to generated feature data 403. In addition, slot capacities may be adaptively adjusted using reinforcement learning using the explore-exploit mechanism discussed herein. For example, an RL-based explore-exploit mechanism can be employed to adaptively determine slot demand and, based on any workforce constraints, the number of available slots may be modified so as to better agree with customer demand while satisfying all the existing constraints, such as endogenous and exogenous constraints.

At step 962, the timeslot capacities are transmitted. For example, timeslot determination computing device 102 may pack the timeslot capacities within timeslot data 360, and transmit timeslot data 360 to web server 104. Web server 104 may display the timeslots, and may allow customers to schedule a pickup or delivery during the timeslots up to their corresponding timeslot capacities. The method then ends.

Figure 10:
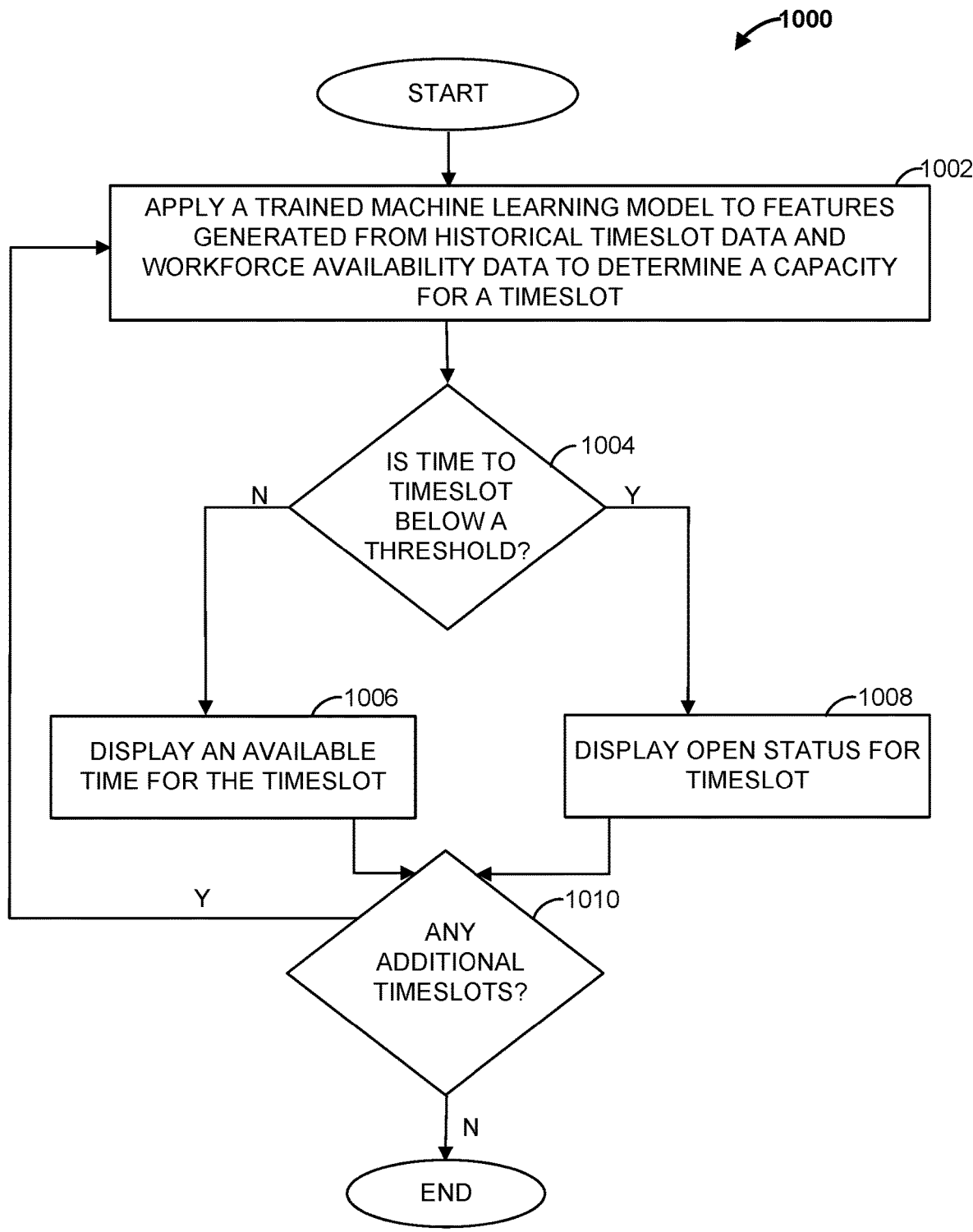
FIG. 10 is a flowchart of another example method that can be carried out by the ecommerce system 100 of FIG. 1 in accordance with some embodiments.

FIG. 10 is a flowchart of an example method 1000 that can be carried out by the ecommerce system 100 of FIG. 1. Beginning at step 1002, a trained machine learning model is applied to features generated from historical timeslot data and workforce availability data to determine a capacity for a timeslot. At step 1004, a determination is made as to whether a time to the timeslot is below a threshold. For example, timeslot determination computing device 102 may compute an amount of time from a current time (e.g., now) to the beginning of the timeslot. As an example, assuming the current day is Tuesday, the time is 2 pm, and the timeslot is for Thursday from 3 pm to 4 pm, the computed amount of time is 2 days and 1 hour (e.g., 49 hours). The computed time is then compared to the threshold (e.g., 7 days) to determine if the computed time is below the threshold. For example, assuming the threshold is 7 days, the computed time of 2 days and 1 hour would be below the threshold. If, however, the computed time were 8 days and 1 hour, the computed time would be above the threshold.

If the computed time is not below the threshold, the method proceeds to step 1006, where an available time is displayed for the timeslot. The available time may be the amount of time remaining until the computed time will be below the threshold (e.g., in our example of 8 days and 1 hour, with a 7 day threshold, the available time would be 1 day and 1 hour). If, however, at step 1004 the computed time is below the threshold, the method proceeds to step 1008, where the timeslot is displayed with a status of "OPEN."

From steps 1006 and 1008, the method proceeds to step 1010 to determine if there are any additional timeslots. For example, timeslot determination computing device 102 may determine if there are any additional timeslots left for any days to which timeslot determination computing device 102 is providing timeslot data 360. If there are any additional timeslots, the method proceeds back to step 1002 to apply the trained machine learning model to features generated for the next timeslot. Otherwise, if there are no additional timeslots, the method ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

The invention claimed is:

1. A system comprising:
    a database; and
    a computing device comprising a memory and at least one processor, wherein the at least one processor is configured to:
        receive, from a web server, a request for capacity information about a plurality of timeslots in a first future period, wherein the first future period is associated with an online order placed by a user;
        obtain, from the database, order data associated with the plurality of timeslots in a first previous period;
        obtain, from the database, workforce availability data for a store associated with the online order for the plurality of timeslots in the first future period;
        generate first features based on the order data;
        generate second features based on the workforce availability data;
        determine, for each timeslot in a major portion of the plurality of timeslots in the first future period, a timeslot capacity based on applying a machine learning model to the first features and the second features, wherein the machine learning model is trained with feature vectors generated based on additional order data and additional workforce availability data;
        determine, for each timeslot in the remaining portion of the plurality of timeslots in the first future period, a first increased timeslot capacity higher than the timeslot capacity based on a reinforcement learning model;
        generate an updated timeslot capacity based on whether the first increased timeslot capacity is met;
        re-train the machine learning model with feature vectors generated based on the order data in the first future period, using the updated timeslot capacity as a ground truth;
        generate updated timeslot data based on the re-trained machine learning model; and
        transmit, to the web server, the updated timeslot data to be displayed to users.

2. The system of claim 1, wherein the machine learning model is a time series model.

3. The system of claim 1, wherein the additional order data is obtained for a second previous period; and
    the additional workforce availability data for the store is obtained for the second previous period.

4. The system of claim 1, wherein the at least one processor is further configured to:
    determine a timeslot availability time for each of the plurality of timeslots based on a predetermined amount of time before each timeslot, wherein the timeslot data comprises the timeslot availability times; and
    provide for display the timeslot availability time for each of the plurality of timeslots.

5. The system of claim 1, wherein the at least one processor is further configured to determine a timeslot availability time for each of the plurality of timeslots based on the workforce availability data, wherein the timeslot data comprises the timeslot availability times.

6. The system of claim 1, wherein the at least one processor is further configured to:
    generate timeslot data comprising: (a) the timeslot capacities for the major portion of the plurality of timeslots in the first future period, and (b) the first increased timeslot capacities for the remaining portion of the plurality of timeslots in the first future period;
    transmit the timeslot data to be displayed to the user for scheduling a pickup or delivery of the online order during one of the plurality of timeslots in the first future period;
    identify whether the first increased timeslot capacity is met based on order data in the first future period; and
    generate the updated timeslot capacity.

7. The system of claim 6, wherein the at least one processor is further configured to:
    generate a predicted timeslot capacity based on the re-trained machine learning model;

determine a second increased timeslot capacity higher than the predicted timeslot capacity based on the reinforcement learning model; and generate the updated timeslot data comprising: (c) the predicted timeslot capacities for a major portion of a second future period, and (d) the second increased timeslot capacities for the remaining portion of the second future period; and wherein the updated timeslot data is displayed to users for scheduling pickup or delivery of online orders in the second future period.

8. A method, implemented by a computing device comprising a memory and at least one processor, comprising:

receiving, from a web server, a request for capacity information about a plurality of timeslots in a first future period, wherein the first future period is associated with an online order placed by a user;

obtaining, from a database, order data associated with the plurality of timeslots in a first previous period;

obtaining, from the database, workforce availability data for a store associated with the online order for the plurality of timeslots in the first future period;

generating first features based on the order data;

generating second features based on the workforce availability data;

determining, for each timeslot in a major portion of the plurality of timeslots in the future period, a timeslot capacity based on applying a machine learning model to the first features and the second features, wherein the machine learning model is trained with feature vectors generated based on additional order data and additional workforce availability data;

determining, for each timeslot in the remaining portion of the plurality of timeslots in the first future period, a first increased timeslot capacity higher than the timeslot capacity based on a reinforcement learning model;

generating an updated timeslot capacity based on whether the first increased timeslot capacity is met;

re-training the machine learning model with feature vectors generated based on the order data in the first future period, using the updated timeslot capacity as a ground truth;

generating updated timeslot data based on the re-trained machine learning model; and transmitting, to a web server, the updated timeslot data to be displayed to users.

9. The method of claim 8, further comprising:

determining a timeslot availability time for each of the plurality of timeslots based on a predetermined amount of time before each timeslot, wherein the timeslot data comprises the timeslot availability times; and providing for display the timeslot availability time for each of the plurality of timeslots.

10. The method of claim 8, further comprising determining a timeslot availability time for each of the plurality of timeslots based on the workforce availability data, wherein the timeslot data comprises the timeslot availability times.

11. The method of claim 8, further comprising:

generating timeslot data comprising: (a) the timeslot capacities for the major portion of the plurality of timeslots in the first future period, and (b) the first increased timeslot capacities for the remaining portion of the plurality of timeslots in the first future period;

transmitting the timeslot data to be displayed to the user for scheduling a pickup or delivery of the online order during one of the plurality of timeslots in the first future period;

identifying whether the first increased timeslot capacity is met based on order data in the first future period; and generating the updated timeslot capacity.

12. The method of claim 11, wherein the updated timeslot capacity is generated based on whether the first increased timeslot capacity is met.

13. The method of claim 11, further comprising:

generating a predicted timeslot capacity based on the re-trained machine learning model;

determining a second increased timeslot capacity higher than the predicted timeslot capacity based on the reinforcement learning model;

generating the updated timeslot data comprising: (c) the predicted timeslot capacities for a major portion of a second future period, and (d) the second increased timeslot capacities for the remaining portion of the second future period; and wherein the updated timeslot data is displayed to users for scheduling pickup or delivery of online orders in the second future period.

14. A non-transitory computer-readable storage medium having instructions stored thereon, wherein the instructions, when executed by at least one processor, cause a device to perform operations comprising:

receiving, from a web server, a request for capacity information about a plurality of timeslots in a first future period, wherein the first future period is associated with an online order placed by a user;

obtaining, from a database, order data associated with the plurality of timeslots in a first previous period;

obtaining, from the database, workforce availability data for a store associated with the online order for the plurality of timeslots in the first future period;

generating first features based on the order data;

generating second features based on the workforce availability data;

determining, for each timeslot in a major portion of the plurality of timeslots in the future period, a timeslot capacity based on applying a machine learning model to the first features and the second features, wherein the machine learning model is trained with feature vectors generated based on additional order data and additional workforce availability data;

determining, for each timeslot in the remaining portion of the plurality of timeslots in the first future period, a first increased timeslot capacity higher than the timeslot capacity based on a reinforcement learning model;

generate an updated timeslot capacity based on whether the first increased timeslot capacity is met;

re-train the machine learning model with feature vectors generated based on the order data in the first future period, using the updated timeslot capacity as a ground truth;

generate updated timeslot data based on the re-trained machine learning model; and transmit, to a web server, the updated timeslot data to be displayed to users.

15. The non-transitory computer-readable storage medium of claim 14, wherein the executable instructions, when executed by the at least one processor, cause the device to perform additional operations comprising:

determining a timeslot availability time for each of the plurality of timeslots based on a predetermined amount of time before each timeslot, wherein the timeslot data comprises the timeslot availability times; and providing for display the timeslot availability time for each of the plurality of timeslots.

16. The non-transitory computer-readable storage medium of claim 14, wherein the executable instructions, when executed by the at least one processor, cause the device to perform additional operations comprising determining a timeslot availability time for each of the plurality of timeslots based on the workforce availability data, wherein the timeslot data comprises the timeslot availability times.

17. The non-transitory computer-readable storage medium of claim 14, wherein the executable instructions, when executed by the at least one processor, cause the device to perform additional operations comprising:
generating timeslot data comprising: (a) the timeslot capacities for the major portion of the plurality of timeslots in the first future period, and (b) the first increased timeslot capacities for the remaining portion of the plurality of timeslots in the first future period;
transmitting the timeslot data to be displayed to the user for scheduling a pickup or delivery of the online order during one of the plurality of timeslots in the first future period;
identifying whether the first increased timeslot capacity is met based on order data in the first future period; and
generating the updated timeslot capacity.

18. The non-transitory computer-readable storage medium of claim 17, wherein the executable instructions, when executed by the at least one processor, cause the device to perform additional operations comprising:
generating a predicted timeslot capacity based on the re-trained machine learning model;
determining a second increased timeslot capacity higher than the predicted timeslot capacity based on the reinforcement learning model; and
generating the updated timeslot data comprising: (c) the predicted timeslot capacities for a major portion of a second future period, and (d) the second increased timeslot capacities for the remaining portion of the second future period; and
wherein transmitting the updated timeslot data to be displayed to users for scheduling pickup or delivery of online orders in the second future period.

* * * * *